United States Patent
Traynor et al.

(10) Patent No.: US 12,003,502 B2
(45) Date of Patent: Jun. 4, 2024

(54) METHOD, APPARATUS, AND COMPUTER PROGRAM PRODUCT FOR SECURE TWO-FACTOR AUTHENTICATION

(71) Applicant: UNIVERSITY OF FLORIDA RESEARCH FOUNDATION, INCORPORATED, Gainesville, FL (US)

(72) Inventors: Patrick G. Traynor, Gainesville, FL (US); Christian Peeters, Gainesville, FL (US); Christopher Patton, San Francisco, CA (US); Imani Sherman, Cincinnati, OH (US); Daniel Olszewski, Gainesville, FL (US); Thomas Shrimpton, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 174 days.

(21) Appl. No.: 17/446,023

(22) Filed: Aug. 26, 2021

(65) Prior Publication Data
US 2022/0078184 A1 Mar. 10, 2022

Related U.S. Application Data

(60) Provisional application No. 63/076,131, filed on Sep. 9, 2020.

(51) Int. Cl.
*H04L 9/40* (2022.01)
*H04W 4/14* (2009.01)
(Continued)

(52) U.S. Cl.
CPC ...... *H04L 63/0838* (2013.01); *H04L 63/0435* (2013.01); *H04L 63/166* (2013.01);
(Continued)

(58) Field of Classification Search
CPC . H04W 4/14; H04W 12/0431; H04W 12/069; H04L 63/0435; H04L 63/0838; H04L 63/166; H04L 2463/082
See application file for complete search history.

(56) References Cited

U.S. PATENT DOCUMENTS

| 2006/0205388 | A1* | 9/2006 | Semple | H04W 12/06 |
| | | | | 455/433 |
| 2007/0077916 | A1* | 4/2007 | Saito | G06F 21/31 |
| | | | | 713/176 |

(Continued)

*Primary Examiner* — Farid Homayounmehr
*Assistant Examiner* — Brian William Avery
(74) *Attorney, Agent, or Firm* — ALSTON & BIRD LLP (57) ABSTRACT

Various methods are provided for secure two-factor authentication, and more specifically, for incorporating a layer of security to two-factor authentication using Short Message Service in a manner virtually transparent to the end-user. Methods may include receiving a request for registration for two-factor authentication from a client including a username and password; providing a request for a mobile device number; receiving the mobile device number and a pre-shared key; sending to a mobile device an identity of the client and a server key share; receiving from the mobile device a mobile device key share; sending information corresponding to an exchange with the mobile device and a challenge derived from the pre-shared key to the client in response to the device key share corresponding to the server key share; receiving confirmation of registration with the mobile device; and establishing a shared key in response to verification of the confirmation.

15 Claims, 7 Drawing Sheets

(51) Int. Cl.
*H04W 12/0431* (2021.01)
*H04W 12/069* (2021.01)

(52) U.S. Cl.
CPC ......... *H04W 4/14* (2013.01); *H04W 12/0431* (2021.01); *H04W 12/069* (2021.01); *H04L 2463/082* (2013.01)

(56) References Cited

U.S. PATENT DOCUMENTS

| | | | | |
|---|---|---|---|---|
| 2011/0145897 | A1* | 6/2011 | Tyree | G06F 21/42 726/6 |
| 2017/0337361 | A1* | 11/2017 | Zhou | G06F 21/31 |
| 2021/0203492 | A1* | 7/2021 | Soares de Resende | H04L 63/0869 |

* cited by examiner

METHOD, APPARATUS, AND COMPUTER PROGRAM PRODUCT FOR SECURE TWO-FACTOR AUTHENTICATION

CROSS-REFERENCE TO RELATED APPLICATIONS

This application claims priority to U.S. Provisional Application Ser. No. 63/076,131, filed on Sep. 9, 2020, the contents of which are hereby incorporated by reference in their entirety.

GOVERNMENT FUNDING

This invention was made with government support under 1617474 awarded by the National Science Foundation. The government has certain rights in the invention.

TECHNOLOGICAL FIELD

Embodiments of the present invention relate generally to a method, apparatus, and computer program product for secure two-factor authentication, and more specifically, for incorporating a layer of security to two-factor authentication using Short Message Service in a manner virtually transparent to the end-user.

BACKGROUND

Multi-factor authentication requires users to provide multiple elements of authentication in order to add additional layers of security. The combination of authentication factors, the specific authentication methods for each factor, and the number of authentication methods may vary across systems. Multi-factor authentication schemes often require two forms of authentication, and as such, are commonly referred to as two-factor authentication (2FA).

Text messaging otherwise known as SMS or Short Message Service messaging is ubiquitous with more than five billion users of devices sending over eight trillion messages annually. The pervasiveness and the binding of phone numbers to user identities has lead many to build services on top of SMS. With relation to security, these services include account validation, anomaly reporting, and one-time passwords (OTPs) for two-factor authentication.

Despite common belief that SMS provides a secure channel for communication, SMS is potentially vulnerable. Adversaries may use redirection attacks to intercept SMS messages and for SMS messages are largely unencrypted. Attacks using SMS redirection can move funds from traditional financial entities, drain cryptocurrency wallets, and enabled spying on other users. Multiple governmental bodies in the US and UK have recommended that SMS no longer be used to deliver one-time passwords.

BRIEF SUMMARY

A method, apparatus and computer program product are therefore provided according to an example embodiment of the present invention for secure two-factor authentication, and more particularly, for incorporating a layer of security to two-factor authentication using Short Message Service in a manner virtually transparent to the end-user. Embodiments provided herein include an apparatus including at least one processor and at least one non-transitory memory including computer program code instructions, the computer program code instructions configured to, when executed, cause the apparatus to at least: receive a request for registration for two-factor authentication from a client; receive a username and a password; provide a request for a mobile device number in response to the username and password corresponding to an account; receive the mobile device number and a pre-shared key; send, to a mobile device corresponding to the mobile device number, an identity of the client and a server key share; receive, from the mobile device, a device key share; send information corresponding to an exchange with the mobile device and a challenge derived from the pre-shared key to the client in response to the device key share corresponding to the server key share; receive, from the client, confirmation of registration with the mobile device; and establish a shared key in response to verification of the confirmation.

According to some embodiments, the mobile device number and the symmetric key are received over a transport layer security (TLS) encrypted channel. The shared key of some embodiments is used for two-factor authentication of the username and password for subsequent login. According to some embodiments, the apparatus is further caused to: receive an access request including the username and password; select a random string; transmit the random string to the mobile device via short message service (SMS); receive a one-time password from the mobile device derived from the random string; and allow the access request in response to the one time password corresponding to the random string based on the shared key. The apparatus of some embodiments is caused to provide information to the client encrypted with the shared key.

Embodiments provided herein include a computer program product including at least one non-transitory computer-readable storage medium having computer-executable program code instructions stored therein, the computer-executable program code instructions including program code instructions to: receive a request for registration for two-factor authentication from a client; receive a username and password; provide a request for a mobile device number in response to the username and password corresponding to an account; receive the mobile device number and a pre-shared key; send, to a mobile device corresponding to the mobile device number, an identity of the client and a server key share; receive, from the mobile device, a device key share; send information corresponding to an exchange with the mobile device and a challenge derived from the pre-shared key to the client in response to the device key share corresponding to the server key share; receive from the client, confirmation of registration with the mobile device; and establish a shared key in response to verification of the confirmation.

According to some embodiments, the mobile device number and the symmetric key are received over a transport layer security (TLS) encrypted channel. The shared key of some embodiments is used for two-factor authentication of the username and password for subsequent login. The computer program product of some embodiments includes program code instructions to: receive an access request including the username and password; select a random string; transmit the random string to the mobile device via short message service (SMS); receive a one-time password from the mobile device derived from the random string; and allow the access request in response to the one time password corresponding to the random string based on the shared key. Embodiments optionally include program code instructions to provide information to the client encrypted with the shared key.

Embodiments provided herein include a method for registering two-factor authentication including: receiving a request for registration for two-factor authentication from a client; receiving a username and password; providing a request for a mobile device number in response to the username and password corresponding to an account; receiving the mobile device number and a pre-shared key; sending, to a mobile device corresponding to the mobile device number, an identity of the client and a server key share; receiving, from the mobile device, a device key share; sending information corresponding to an exchange with the mobile device and a challenge derived from the pre-shared key to the client in response to the device key share corresponding to the server key share; receiving from the client, confirmation of registration with the mobile device; and establishing a shared key in response to verification of the confirmation.

According to an example embodiment, the mobile device number and the symmetric key are received over a transport layer security (TLS) encrypted channel. The shared key of some embodiments is used for two-factor authentication of the username and password for subsequent login. Methods of some embodiments include: receiving an access request including the username and password; selecting a random string; transmitting the random string to the mobile device via short message service; receiving a one-time password from the mobile device derived from the random string; and allowing the access request in response to the one-time password corresponding to the random string based on the shared key. Method may include providing information to the client encrypted with the shared key.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Thus, use of any such terms should not be taken to limit the spirit and scope of embodiments of the present invention.

Short Message Service (SMS) based two-factor authentication (2FA) is the most widely deployed two-factor authentication mechanism, despite the fact that SMS messages are potentially vulnerable to rerouting attacks. This may be due to the use of SMS messages as widely accepted and part of a mobile device user's everyday activities. Accepting the practical reality, embodiments described herein provide a new SMS-based protocol that makes rerouting attacks useless to adversaries who aim to takeover user accounts. Embodiments described herein deliver one-time passwords (OTP) via text message (SMS) in a manner that adds minimal overhead to both the user and the server over existing SMS-based methods and is implemented with only small changes to the stock text-message applications already employed by mobile devices. The security of example embodiments relies on a provably secure authenticated key-change protocol that does not place significant new burdens upon a user, which would hamper adoption.

While SMS messages are potentially vulnerable to hacking in one form or another, and recommendations generally discourage SMS messaging for exchange of one-time passwords, such recommendations stand in opposition to the momentum of real-world circumstances. In particular, SMS-based two-factor authentication is the most widely used method of two-factor authentication with many large websites offering no other alternatives. Further, users consistently pick SMS-based 2FA because of its usability and the user's comfort with text messaging. Further, 2FA provides an enhanced level of security over single-factor authentication, such that users believe they are already more substantially protected from hacking.

Embodiments described herein provide a protocol to protect OTP sent via SMS from redirection attacks. Rather than send the OTP itself, the server of example embodiments sends a nonce from which the mobile device derives the OTP, using a secret key shared with the server. To securely establish the shared secret, embodiments may include a new authenticated key-exchange (AKE) scheme, which leverages existing communications and public-key infrastructure as-is and requires no trusted setup of the mobile device. These properties are made possible by the user, who intervenes during registration to pass messages between the mobile device and the server. This process resembles the usual procedure for SMS-based 2FA; however, the user may be required to scan a Quick Response (QR) code displayed on their web client (e.g., a browser) using their mobile device's camera. Embodiments also function when the web client is run on the user's mobile device where scanning of a QR code is not necessary.

Figure 1:
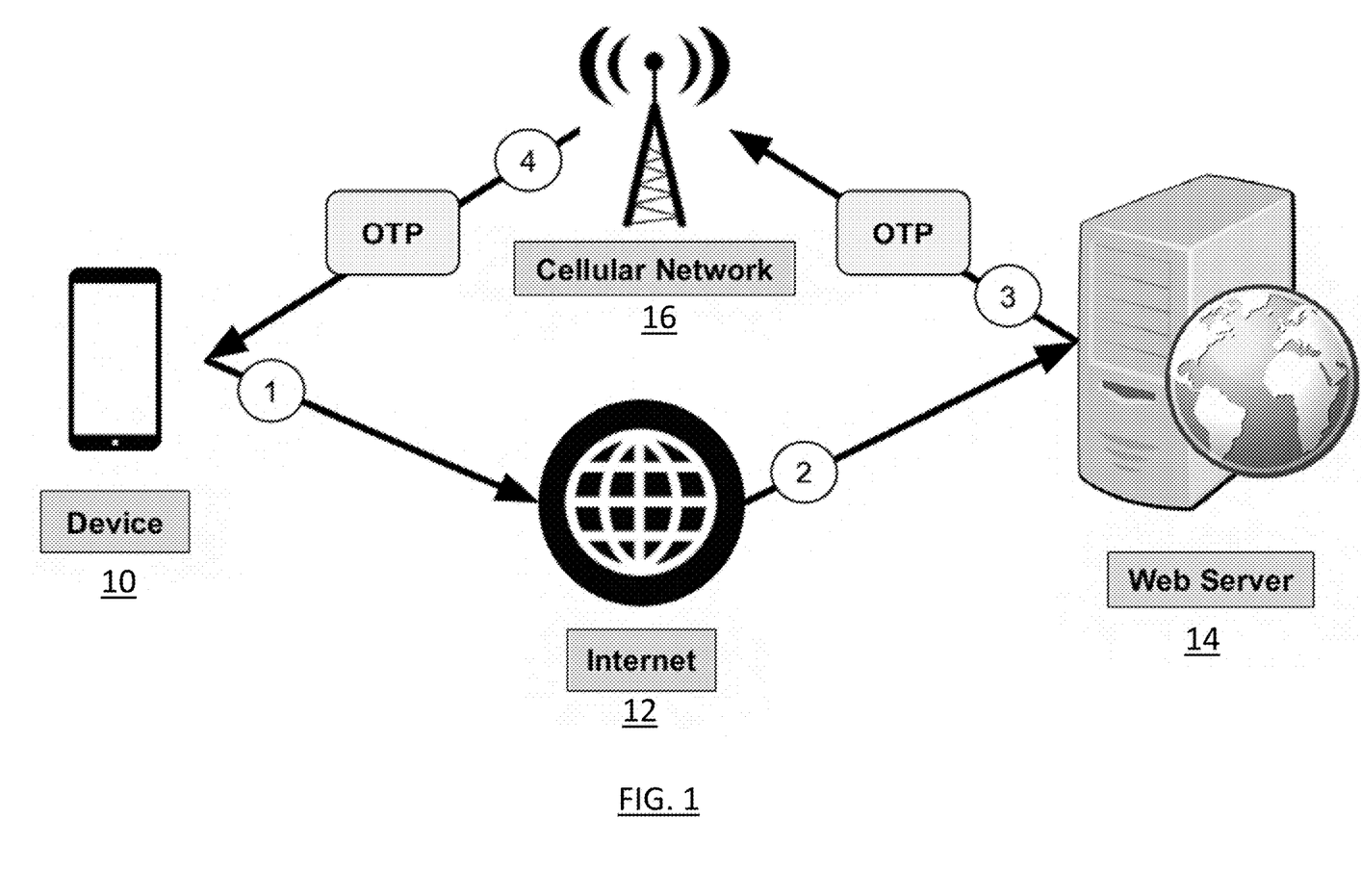
FIG. 1 illustrates a two-phase protocol of 2FA at a high level according to an example embodiment of the present disclosure.

FIG. 1 illustrates a two-phase protocol of 2FA at a high level according to an example embodiment of the present disclosure. FIG. 1 depicts a system that supports wireless communication between a device 10 and a server 14. The device 10 and the server 14 may be in communication via a network, such as the illustrated cellular network 16 and/or the Internet 12. However, the computing device and the server may be in communication in other manners, such as via direct communications between the device and the server.

As shown, the device 10 may be embodied by a number of different devices including mobile computing devices, such as a personal digital assistant (PDA), mobile telephone, smartphone, laptop computer, tablet computer, or any combination of the aforementioned. Alternatively, the computing device may be a fixed computing device, such as a personal computer, a computer workstation or the like. The server 14 may also be embodied by a computing device and, in one embodiment, is embodied by a web server. Additionally, while the system of FIG. 1 depicts a single server, the server may be comprised of a plurality of servers which may collaborate to support browsing activity conducted by the computing device. The device 10 will be hereinafter described as a mobile device such as a smart phone or cell phone, but may be either mobile or fixed in the various embodiments.

Figure 2:
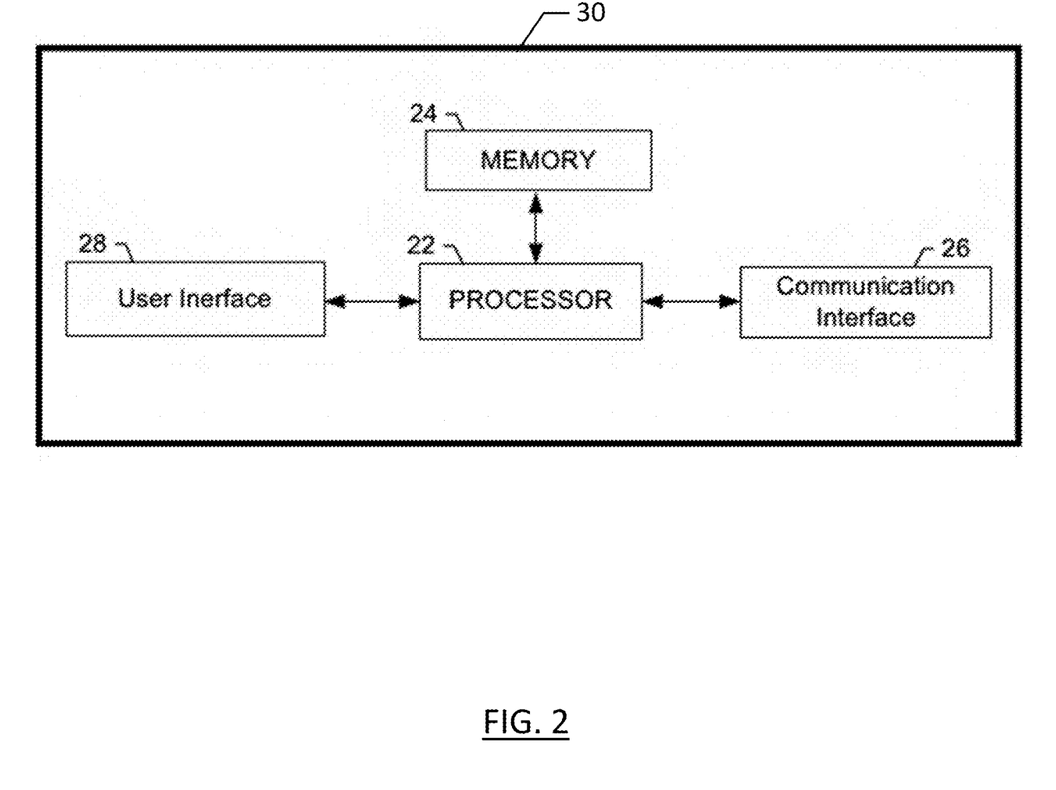
FIG. 2 is a block diagram of an apparatus that may be specifically configured in accordance with an example embodiment of the present disclosure.

Regardless of the type of device that embodies the device 10, the device may include or be associated with an apparatus 30 as shown in FIG. 2. In this regard, the apparatus may include or otherwise be in communication with a processor 22, a memory 24, a communication interface 26 and a user interface 28. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory 24 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 30 to carry out various functions in accordance with an example embodiment of the present invention. For example, the memory device could be configured to buffer input data for processing by the processor. Additionally or alternatively, the memory device could be configured to store instructions for execution by the processor.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 28.

Meanwhile, the communication interface 26 may be any means such as a device or circuitry embodied in either hardware or a combination of hardware and software that is configured to receive and/or transmit data between the device 10 and a server, such as an Internet 12 server. In this regard, the communication interface 26 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the user interface 28, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 28 may be in communication with the processor 22, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. The user interface may also be in communication with the memory 24 and/or the communication interface 26, such as via a bus.

Embodiments of the device 10 of FIG. 1, which may be embodied by the apparatus 30 illustrated in FIG. 2, are configured herein for a novel two-factor authentication method that solves problems identified by the inventors as potential security threats such that the two-factor authentication method described herein is more robust and secure than existing methods, particularly those employing SMS-based two-factor authentication.

Two-Factor Authentication Methods

Two-factor authentication for computing is achieved through various methods. Though the combination of authentication methods may differ, most common implementations of 2FA require a traditional password in conjunction with a second alternative authentication method. Authentication methods may include biometrics, hardware tokens, software tokens, additional knowledge factors (e.g., personal questions), device characteristics, both current and historic information, and phone numbers. Despite the variety of possibilities, the majority of 2FA includes three primary variants: hardware tokens, software tokens, and SMS-based 2FA.

Although hardware tokens were the first to be adopted, SMS-based 2FA became the most common form of 2FA based on the ubiquity of mobile devices and the widespread availability of SMS messaging. Referring again to FIG. 1, the illustrated diagram may be configured for a two-phase protocol of 2FA at a high level. The registration phase allows a user to associate their phone number from their device 10 with an account for a website or system on web server 14 over the Internet 12. Once the user provides their phone number, the web server 14 sends an SMS message containing a randomly chosen one-time password (OTP) with a short validity period via cellular network 16 using an IP-to-cellular gateway. The browser for the web server 14 then prompts the user to enter the OTP once the message is received. If the input matches what the web server 14 sent within the validity period, which may be a matter of minutes or hours, registration completes and the phone number is associated with a user's account for future authentication.

The authentication phase occurs during every subsequent login. As in the registration phase, an OTP is sent via SMS from the server 14 to the device 10 associated with a user's phone number. Authentication is complete once the user types the correct OTP in the web client. 2FA can also be accomplished using alternative technologies. Hardware tokens are physical devices that traditionally provide authentication through an OTP that is manually entered. Modern devices can provide authentication using public-key cryptography via USB or wireless connection. 2FA can also be implemented using software tokens, such as using smartphone apps to provide a user with a manual entry TOP or have the user explicitly 'allow' or 'reject' logins using push notifications.

While hardware tokens and software tokens may provide a more robust and more secure 2FA, there are many usability factors that may contribute to the lack of user interest in alternatives to SMS based 2FA. In addition to hardware tokens requiring an initial financial investment by users, there is a lack of support from websites and systems. Further, hardware tokens require users to carry another device. While software tokens resolve some of these issues, the lack of standardization of software tokens has hampered adoption. The complexity of hardware and software tokens to the average user has often resulted in websites and services offering SMS-based 2FA as a backup, which largely eliminates any security advantages gained from using other 2FA methods. SMS-based 2FA is entrenched and well-liked by users, such that embodiments described herein to mitigate the security vulnerabilities of current SMS-based 2FA are particularly important and desirable.

Rerouting Attacks

Although attacks on SMS-based 2FA have become more prevalent, vulnerabilities in SMS have long existed. There are two common attacks on SMS-based 2FA: message rerouting via Signaling System 7 (SS7) and what are commonly referred to as SIM (Subscriber Identity Module) swap attacks. The former exploits weaknesses in legacy cellular technology, while the later capitalizes on the lack of customer authentication provided by telecommunication companies.

Telecommunication networks are a conglomeration of interconnected communication network technologies which includes cellular, landline, and VoIP (Voice over Internet Protocol). The underlying protocols responsible for standard operations are unique to each network technology. In order to communicate with one another, telecommunications networks use the protocol suite known as SS7. This standard suite of protocols forms an all-digital network that is responsible for both signaling between core elements within a network and communication between different networks.

Figure 3:
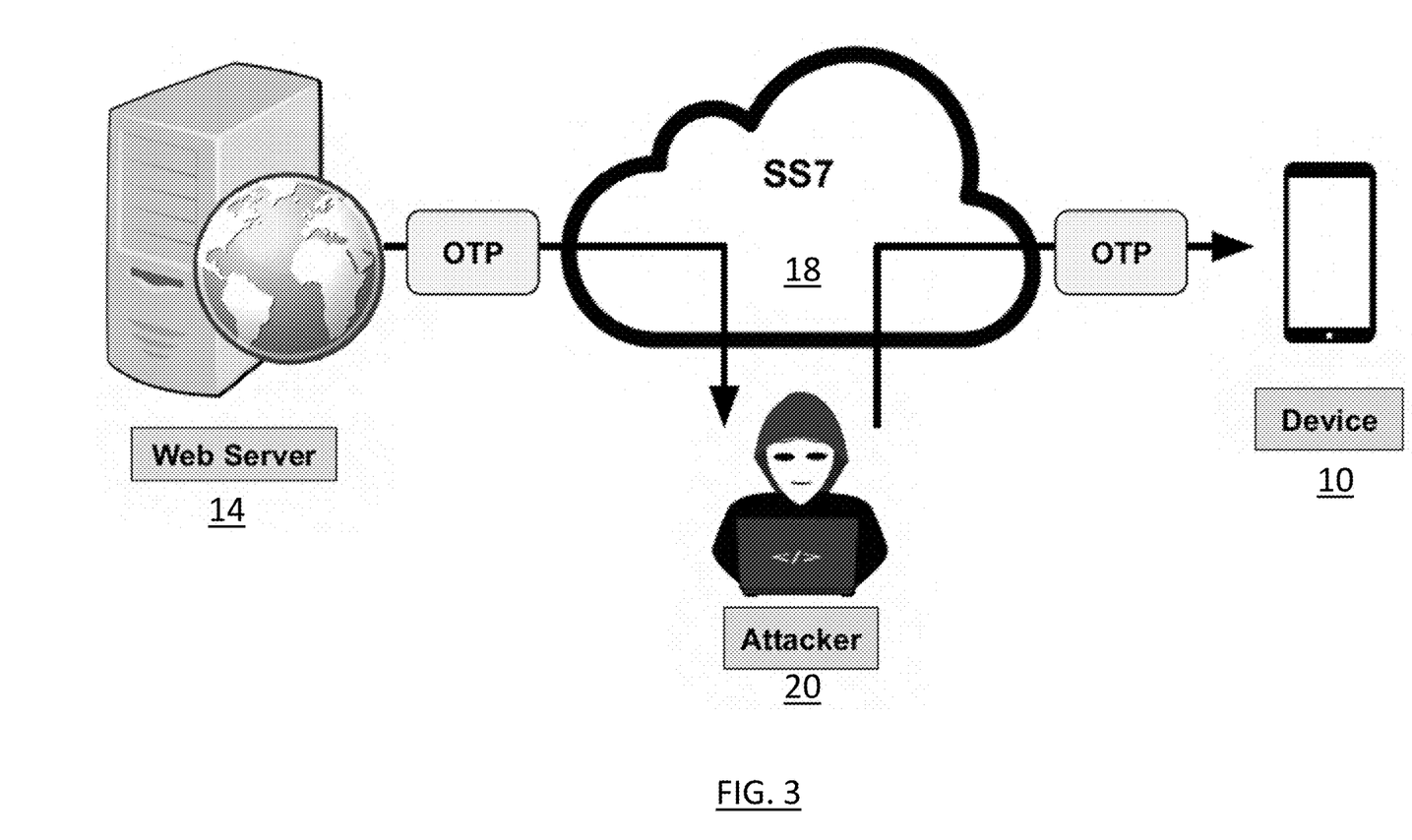
FIG. 3 illustrates a flow diagram of a rerouting attack according to an embodiment of the present disclosure.

SS7 was built with weak security assumptions that no longer hold true. Adversaries willing to purchase access to the SS7 network core can intercept call audio, intercept SMS/MMS (Multimedia Messaging Service) messages, deny services, and obtain mobile device location information. This rerouting type of attack, illustrated in FIG. 3, can be interpreted as a BGP (Border Gateway Protocol) rerouting attack on the context of telephony networks. Through SMS interception via SS7, it is possible for attackers to recover 2FA OTPs. This has lead to compromised bank accounts, email addresses, and cryptocurrency wallets. FIG. 3 illustrates an attacker 20 controlling a node in an SS7 network 18, where the attacker is able to reroute traffic. When a server 14 sends a 2FA OTP over the cellular network, the plaintext SMS message can be rerouted to an attacker. The attacker can then forward the message on to the intended user in efforts to make them unaware of the attack. Proposed mechanisms to thwart rerouting attacks primarily focus on network layer filtering, though these are largely ineffective. While the attacker needs to also have access to a password of the account, such password availability is becoming more frequent with large database hacks and the exploitation of private user data in forums such as the dark web. The username/password information that can be intercepted through a number of sources can then be used in conjunction with the rerouted OTP to obtain illicit access to a user's account with the service provider on the web server 14.

Figure 4:
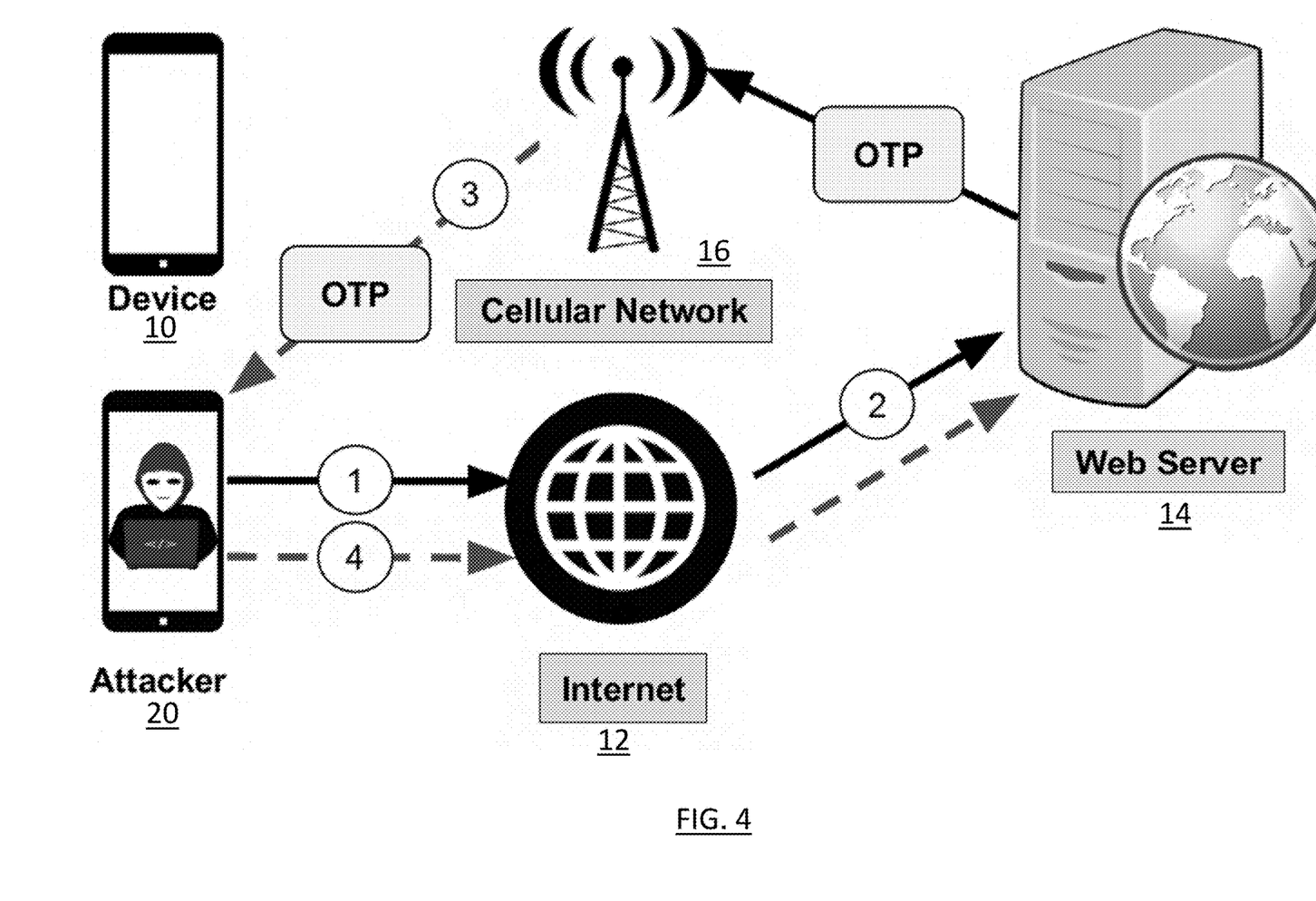
FIG. 4 illustrates a flow diagram of a SIM swap attack according to an embodiment of the present disclosure.

SIM swap attacks exploit the lack of customer authentication involved with replacing a lost or damaged SIM card. These cards contain the symmetric key used for device authentication with a network. Shortly after a new replacement SIM card is activated, the original SIM card will no longer connect to a cellular network. SIM cards can often be acquired free and with minimal identification in some circumstances. An attacker can execute a SIM swap attack, illustrated in FIG. 4, by assuming the identity of a customer or by contracting the assistance of an employee working at one of the cell provider's stores. Once the new SIM card has been activated, the attacker 20 will receive all messages for a targeted phone number, including 2FA OTP messages. The user eventually becomes aware of the problem when their device no longer connects to the network. Even if the length of time is small before a user becomes aware of the attack, the process of regaining control of the phone number can be lengthy. A user may need to visit a provider's retail store and begin the SIM replacement process. A victim may be aware of an attack occurring, but unable to stop the attack before it is complete.

The motivation behind SIM swap attacks can vary. In some cases adversaries have financial incentives and will attack 2FA cryptocurrency wallets. Other cases may include where attacks have targeted celebrities and politicians to hijack social media and other personal accounts.

The SMS OTP Security (SOS) Protocol

Embodiments provided herein provide an SMS OTP Security protocol, or SOS protocol to mitigate OTP rerouting attacks while mimicking traditional SMS-based 2FA to the user (to the maximum extent possible) in both the registration and authentication procedures. To improve the likelihood of deployment and adoption, embodiments of the SOS protocol described herein employ existing communication and public-key infrastructure as-is. The SOS protocol of example embodiments is thus substantially transparent in implementation to a user while not requiring any additional infrastructure investment by providers, rendering the SOS protocol of the present disclosure ideal for large-scale implementation and adoption.

One goal of embodiments described herein is to minimize the number of SMS messages. From both the usability and deployment perspectives, the minimization of the number of messages in the SOS protocol operations is desirable. SMS is an asynchronous service, with no guarantees on delivery time or the order in which messages are received. Further, cellular networks are only provisioned to accommodate typical network conditions: significant increases in traffic beyond this can result in limited service to users in affected areas. Sending large amounts of information over multiple SMS messages may result in a significant delivery time and potentially be prone to error during message assembly. Beyond decreasing reliability, high communication overhead can also have a financial impact on both the deploying server and the user. Commonly, servers that deploy SMS functionality are charged by telecommunications providers based on the number of messages sent and received. Users may also have a similar plan from their telecommunications provider.

As SMS-based 2FA is generally preferred by users, embodiments described herein mimic the registration and authentication phases of traditional SMS-based 2FA. In particular, added security functionality of example embodiments remains primarily hidden from users such that regardless of the steps necessary to securely deliver an OTP via SMS, it is presented to users as if no protocol changes have been made. Such seamless integration requires embodiments to be incorporated into default messaging applications, which would allow most of the process to proceed undetected. The device then performs the steps to obtain an OTP from a message and present it to the user in the default messaging app as if it were sent in plaintext.

As protocols whose operation or security requires major changes in telecommunication infrastructure has little hope of adoption, embodiments aim to use the current communications network infrastructure. Further, to foster adoption by enterprises wishing to employ SMS-based 2FA with their users, embodiments minimize the impact of implementing the system upon authentication servers. In the traditional SMS-based 2FA, the server simply generates an OTP, sends it to a device, and waits for the client's response. Otherwise its operation is stateless and there is no trusted setup of the device (e.g., distribution of certificates or symmetric keys). As these features render traditional SMS-based 2FA easy to deploy, embodiments described herein minimize overhead.

Threat Model

Traditional SMS-based 2FA is vulnerable to rerouting attacks. Regardless of how the attack is realized—a compromised SS7 node, SIM swap attacks, or otherwise—the goal of the attack is to impersonate a valid user to an authentication server. Embodiments described herein model threats to improve the security of the SOS protocol.

Typically, the first authentication factor in 2FA is a password. Hence, impersonating a user to a server requires knowledge of the user's password and the ability to obtain the OTP. Before the authentication phase, but after registration, an example model presumes that the adversary has obtained a user's password, such as by a phishing attack or database hack. If the password is compromised prior to registration, the attacker can register itself with the 2FA and the hope for security is moot. Models described herein further assume that the user's mobile device is not under control of the attacker, neither by remotely controlling its software (e.g., by installing malware) nor by theft of the physical device.

A party requesting authentication and providing the authentication service is identified as the 'server'. In practice, the party requesting authentication and party providing the authentication may be distinct, organizationally separated entities; however, they can be modeled as a single participant in the protocol. The other participants in the 2FA include the client, which is some endpoint in the Internet, and the 'device', some endpoint in a cellular network. Both are under physical control of the user. These might be co-located on the same physical machine, such as an Internet-capable smartphone. Even so, these will be treated as separate entities. Communication among the parties is as follows:

The client and the server communicate over the Internet; presuming they are capable of establishing a server-authenticated session (e.g., HTTPS).

The device and the server communicate over the mobile telephony network, using only SMS messages.

The device and the client do not automatically communicate over a network, as discussed below, as they communicate only by intervention on the part of the user.

While the focus of the SOS protocol is thwarting rerouting attacks, embodiments adopt a stronger threat model for network adversaries. Embodiments assume that the adversary observes all communication channels between the entities, including the SMS channel between the device and the server, the Internet connection between the server and the client, and the user-enabled channel between the client and the device. Further, the adversary is capable of manipulating all channels except the device-client channel that is user established and controlled. This presumption enables a protocol that does not require the device to be provisioned with any cryptographic assets beforehand. This model is close to the Bellare-Rogaway model for formalizing security of authentication (EA) and authenticated-key exchange (AKE). Embodiments described herein capture an adversary's inability to manipulate the channel between the client and the device. The Short Authenticated String (SAS) channel described herein allows communication that is subject to adversarial observation only. For example, it is common for both smartphones and feature phones to include cameras and software capable of scanning QR codes, which are capable of encoding a few hundred bytes of information. Assuming the device is under physical control of the user, it is possible to convey information via this SAS channel without the opportunity for an adversary to manipulate or capture the information.

SOS Protocol

Having established the design goals and the thread model, the embodiments of the registration and authentication phases of the SOS protocol are herein described. Embodiments mitigate OTP-rerouting attacks against authentication as rather than sending the OTP over SMS, the OTP is derived from the symmetric key and a nonce using a pseudorandom function. Embodiments use a random challenge generated by the server and sent to the client via SMS. This avoids the need to synchronize state between the device and server. By integrating SOS directly into the device's operating system, it is possible for the authentication phase to perfectly mimic the authentication process of traditional SMS-based 2FA. However, the server and device need to share a key. Embodiments provide a protocol for securely establishing this shared secret that closely mimics the registration process for traditional SMS-based 2FA.

SOS Protocol Registration

Registration begins when the user logs into the server. First, the client and server establish a server-authenticated TLS (Transport Layer Security) session (e.g., an HTTPS connection). Second, the user types in their password, thereby authenticating the client to the user. The user is then prompted to type in the phone number of the device being registered. Along with the phone number, the client also generates a symmetric key and sends it over the TLS-encrypted channel to the server. This key is referred to as $K_{psk}$ to denote the fact that it is the pre-shared key of the client and server. It is used to carry out an authenticated key-exchange (AKE) between the server and the device.

Figure 5:
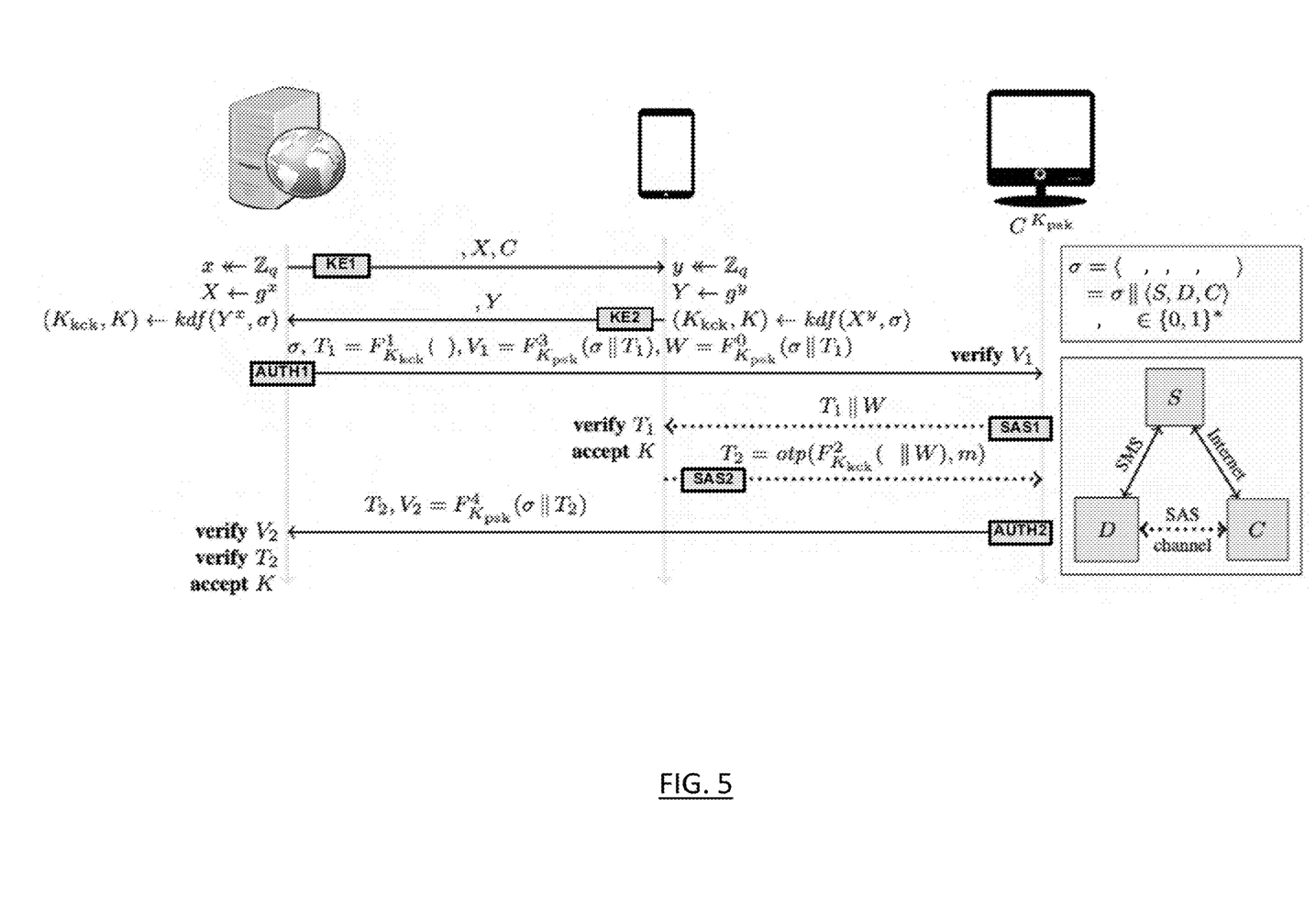
FIG. 5 illustrates the message flow during the registration process for the SOS protocol according to an example embodiment of the present disclosure.

The AKE protocol is illustrated in FIG. 5. It includes three primitives: a Diffie-Hellamn (DH) function (for a prime-order cyclic group, where g denotes the group generator); the HKDF key-derivation function (kdf); and a pseudorandom function (F). The AKE protocol has two phases: the key-exchange phase in which the server and device exchange DH key shares $g^x$ and $g^y$; and the key-confirmation phase in which the device and server prove to one another that they have engaged in matching conversations and agree on the DH shared secret $g^{xy}$.

As shown in FIG. 5, the server S speaks first for the key exchange in message KE1, sending the device D (over SMS) the following quantities: a string $\alpha_1$ (defined below), its key share $g^x$, and the identity C of the client (e.g., the username). Embodiments employ a DH function for which group elements have a compact representation: in particular, group (g) is the main subgroup on the Curve25519 elliptic curve, which offers 128 bits of security and is designed for use with the elliptic curve Diffie-Hellman (ECDH) key agreement scheme. Points in this group can be encoded with just 32 bytes, well below the maximum length of a single SMS. The device D replies to S in message KE2 with a string $\alpha_2$ and its key share $g^y$.

For key confirmation, the server S and the device D confirm they agree on the values of $\alpha_1$, $\alpha_2$, $g^x$, and $g^y$ as well as the identities of the client C (e.g., the username), the device D (e.g., the phone number), and server S (e.g., the domain of the service provider). Key confirmation exploits the mutual trust in the client C, who shares a key $K_{psk}$ with S and who communicates with D over an SAS (Short Authenticated String) channel, defined below.

The device and server derive two keys from $g^{xy}$: the authentication key K, which will be used in the authentication phase if registration succeeds; and the key-confirmation key $K_{kck}$, which is used for key confirmation. The server S confirms to D that it has computed the correct key by computing a MAC (Media Access Control) $T_1$ over the transcript of the key exchange using $K_{kck}$. It will then send the following values to C via the AUTH1 message of FIG. 5: the transcript σ of its conversation with D, the MAC $T_1$, and a challenge W derived from $K_{psk}$. The server also computes a MAC over σ and $T_1$ using $K_{psk}$ in order to ensure integrity of these values as they transit the internet.

After verifying the MAC, the client transmits $T_1$∥W to the device on the SAS channel (SAS1 of FIG. 5). Upon receipt of these values, the device D first verifies $T_1$ using $K_{kck}$. If this succeeds, then device D deems registration successful and outputs K. Finally, device D confirms to server S it has computed the correct key by computing a MAC over the transcript of the key exchange and the challenge W. Rather than transmit the MAC itself, the device 'truncates' the MAC to obtain a string $T_2$ and sends it over the SAS channel (SAS2 of FIG. 5). In the last step (AUTH2 of FIG. 5), client C transmits $T_2$ to server S computing a MAC over $T_2$ with $K_{psk}$, for integrity as the messages transits the Internet. Finally, S verifies $T_2$ using $K_{kck}$. If this succeeds, then S deems registration successful and outputs K.

The first SAS-channel message (SAS1 of FIG. 5) is sent from the client to the device. The means by which the SAS messages are transmitted between the client and the device can vary, and the mediums selected for embodiments described herein minimize changes compared to traditional SMS-based 2FA. When the device and client are physically separated (e.g., if a user is registering their mobile phone using a computer), this is accomplished by having the client display a QR code (e.g., in the web browser) that encodes $T_1$∥W. The user scans the code using the device's camera. When the device and client are co-located (e.g., if a user is registering on their internet-capable smartphone), the SAS1 message is transmitted to the device directly via the mobile web browser. The user is then given a push notification from the browser, as it is important that the user gives explicit permission for registration to proceed for security purposes.

The second SAS-channel message (SAS2 of FIG. 5) is identical to the last step of registration in traditional SMS-based 2FA: the device displays an OTP that encodes $T_2$, and the user inputs the OTP into the client. The string $T_2$ is truncated to [log m] bits, where m is the largest integer that may be encoded by an OTP.

From the point of view of the user, the execution of the AKE protocol between the device and the server is nearly completely transparent. The only difference in the process is an additional step of scanning a QR code to convey the SAS1 message from the device to the client when the two are physically separated.

Figure 6:
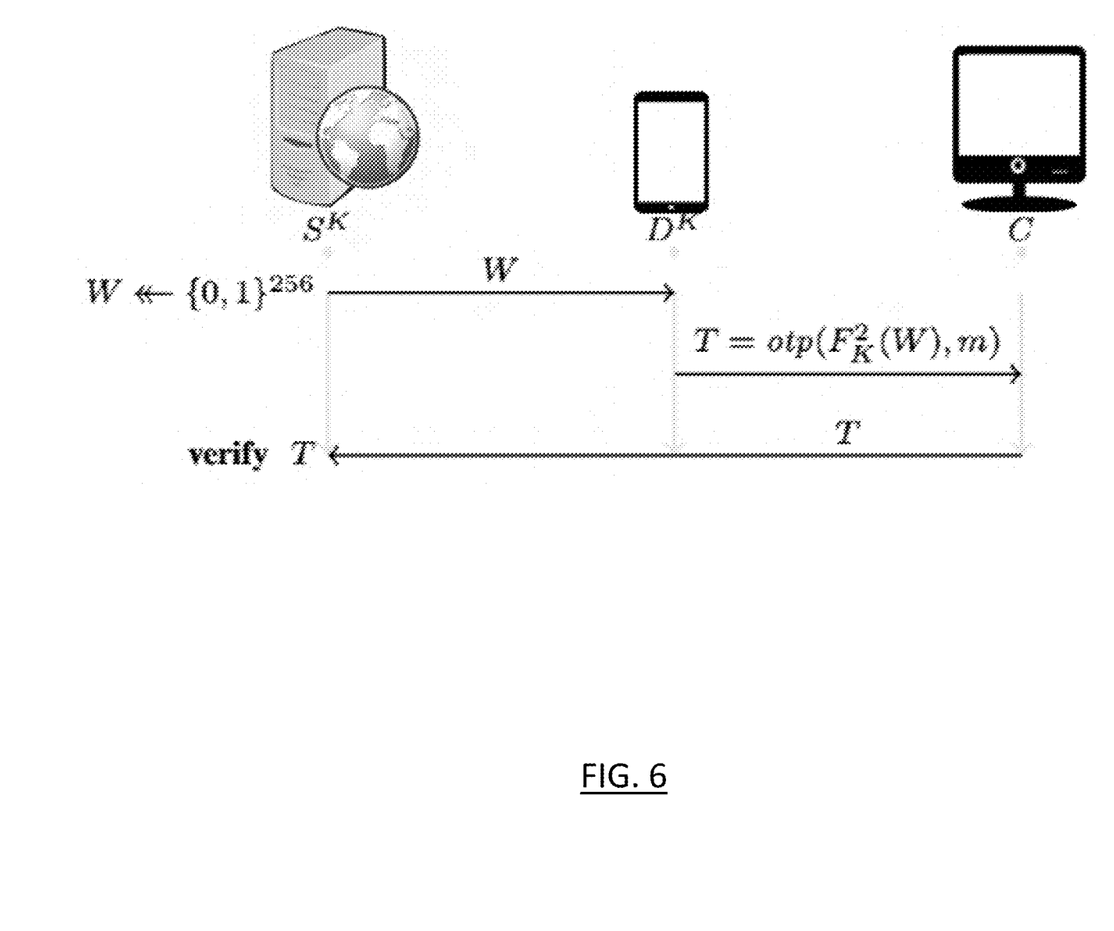
FIG. 6 illustrates the message flow during the authentication process for the SOS protocol according to an example embodiment of the present disclosure.

If registration succeeds, then the device and server agree on the authentication key K. During the authentication phase, this key is used in the following challenge-response protocol. The server requests authentication by choosing a random, 256-bit string W (the same length as the challenge in the registration phase) and sending W to the device over SMS. The device derives an OTP by computing a MAC over W under key K and truncating the MAC to obtain a [log m]-bit string T. It then displays the OTP T to the user who inputs it to the client. The client sends the OTP to the server, where the server verifies Tin the usual way and then accepts. This simple protocol is illustrated in FIG. 6.

The authentication protocol is sufficient to thwart OTP-rerouting attacks. It is important that the challenge is non-repeating, such that a challenge length is chosen that is long enough to ensure that the probability of randomly generated challenges colliding is negligible, such as 32 bytes. The security goal of example embodiments is that of key indistinguishability, which captures the adversary's inability to discern any useful information about the authentication key K, even when the client and server are under active attack: with the exception of messages written to the SAS channel, the adversary is capable of manipulating any message sent in the protocol (e.g., over the Internet or SMS). In addition to key indistinguishability, security in example embodiments implies that forward secrecy holds after the key $K_{psk}$, shared by the client and server is compromised. In particular, this ensures that the authentication key K remains secret even after all other assets including the password are compromised.

Generally, the security of a protocol relying on OTPs benefits from an increased length of the OTP during registration (SAS2 of FIG. 5). The shorter the OTP, the more likely it becomes that an adversary may be able to successfully attack some execution of the registration protocol and learn the authentication key. The success probability increases significantly as a function of the number of sessions attacked, and not the adversary's computational power. Thus, even for a modest OTP length, targeted attacks are infeasible.

The SOS protocol described herein mitigates OTP-rerouting attacks using a shared secret key established during registration. The SOS protocol uses an AKE protocol that forms the core of the registration phase. The protocol requires no provisioning of cryptographic assets on the device, and instead leverages an SAS channel realized by user interaction. The SOS protocol requires only one message per authentication and two per registration, minimizing the message load. The SOS protocol operates entirely at end devices and requires only an IP-to-cellular gateway for servers, which entities using traditional SMS-based 2FA already have, requiring no new infrastructure to implement. The only notable change to a user is the use of a QR code to be scanned during registration such that there is no substantial difference in usability of the SOS protocol as compared to traditional SMS-based 2FA.

Key Backup

In the event of a SIM swap attack, an adversary is unable to derive the correct OTP without the authentication key. Defending against these attacks is an essential feature of the SOS protocol. However, the requirement to store a key means that, like other methods of 2FA, embodiments need a mechanism to migrate the authentication key to new devices. The most user-friendly recovery method capitalizes on full device backups via network storage. Many device manufacturers encourage users to regularly perform full device backups to their respective cloud storage services. These processes have even become automated and backups often occur daily provided the device is connected to the internet. Embodiments enable users to have an option to include their SOS authentication keys as part of a network backup. The option to encrypt the backup of the SOS keys can be offered for users desiring enhanced security.

In the event that a migration is planned and the current device is still accessible, users may transfer authentication keys directly. To secure this transfer, both devices can perform a handshake and prompt the user with an OTP. The user can then confirm that the OTPs on each device match before transferring the SOS keys to secure the process.

If a user loses or damages their mobile device, the keys are most likely lost and unrecoverable without a device backup. This problem is complex and affects all secure methods of 2FA by design. The re-registration process for secure methods of 2FA is uniquely determined by each deploying server. The SOS protocol recovery is dependent upon the server policy, which may include single-use backup codes or other techniques.

Figure 7:
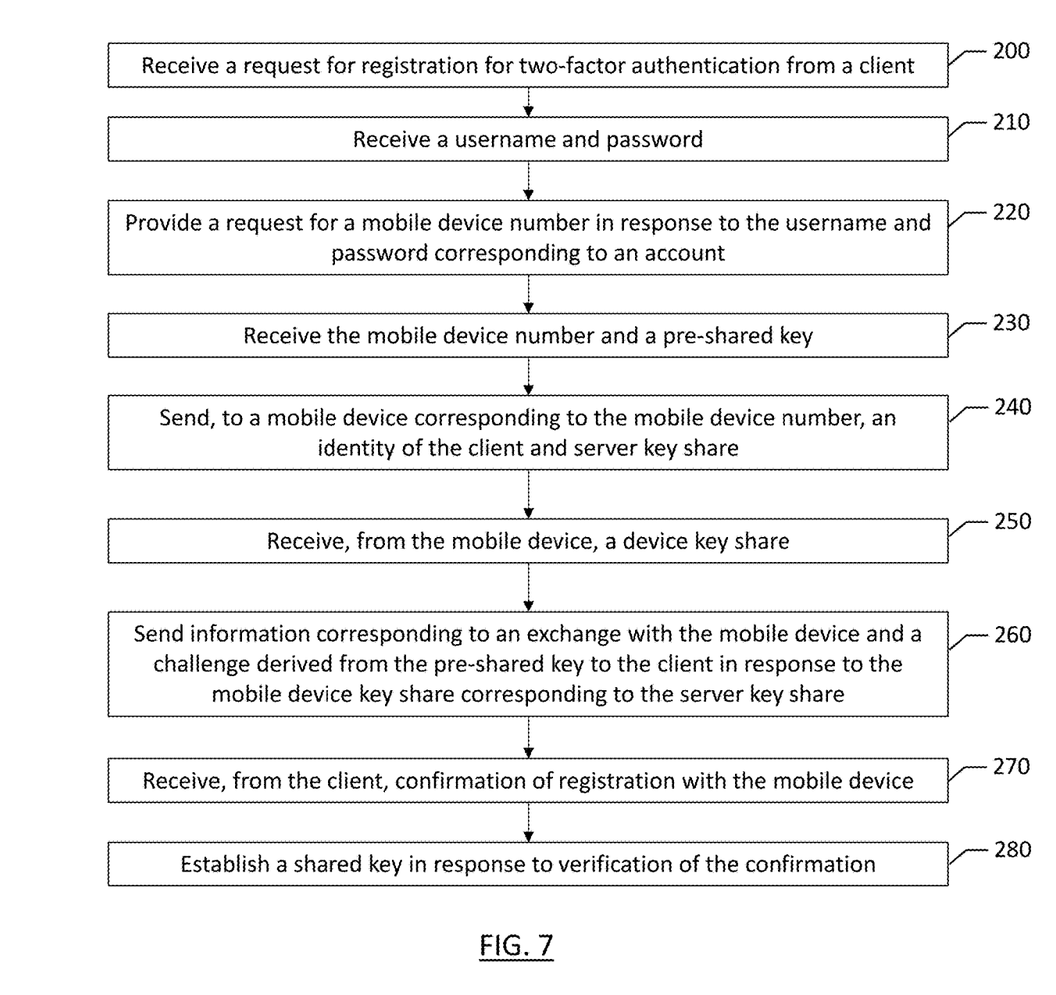
FIG. 7 is a flowchart illustrating a method of operating an example apparatus in accordance with an embodiment of the present disclosure.

FIG. 7 illustrates an example flowchart of the example operations performed by a method, apparatus and computer program product in accordance with an embodiment of the present disclosure. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 24 of an apparatus employing an embodiment of the present invention and executed by a processor 22 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 7, when executed, convert a computer or processing circuitry into a particular machine configured to perform an example embodiment of the present invention. Accordingly, the operations of FIG. 7 define an algorithm for configuring a computer or processing to perform an example embodiment. In some cases, a general purpose computer may be provided with an instance of the processor which performs the algorithms of FIG. 7 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some example embodiments, a method, apparatus and computer program product may be configured for incorporating a layer of security to two-factor authentication using Short Message Service in a manner virtually transparent to the end-user. FIG. 7 is an example flowchart illustrating a method for exchanging secure one-time passwords (OTPs) via short message service (SMS) using embodiments of the SOS protocol detailed herein. As illustrated, a request for registration for two-factor authentication is received at a server from a client at 200. This request may be provided based on the server, such as a web server 14, offering two-factor authentication to a user as a more secure option for account access to an account accessed through the web server. A username and password are received from the client at 210. The username and password may be entered, by a user, via a user interface 28 of an apparatus 30, for example. The server may provide a request for a mobile device number in response to the username and password corresponding to an account at 220. The mobile device number may be received at the server at 230 along with a pre-shared key or symmetrical key.

According to the flowchart of FIG. 7, the server sends, to a mobile device corresponding to the mobile device number, an identity of the client and server key share as shown at 240. The mobile device, in turn, provides a device key share at 250 to the server. Information corresponding to an exchange with the mobile device and a challenge derived from the pre-shared key is sent to the client in response to the mobile device key share corresponding to the server key share at 260. Confirmation of registration with the mobile device is received from the client at 270. A shared key is established in response to verification of the confirmation at 280. The shared key is then ready to use as an added layer of security in a two-factor authentication process between the device and the server, without being vulnerable to rerouting attacks.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
   receive a request for registration for two-factor authentication from a client;
   receive a username and password;
   provide a request for a mobile device number in response to the username and password corresponding to an account;
   receive the mobile device number and a pre-shared key;
   send, to a mobile device corresponding to the mobile device number, an identity of the client and a server key share;
   receive, from the mobile device, a device key share;
   send information corresponding to an exchange with the mobile device and a challenge derived from the pre-shared key to the client in response to the device key share corresponding to the server key share;
   receive, from the client, confirmation of registration with the mobile device;
   establish a shared key in response to verification of the confirmation;
   receive an access request including the username and password;
   select a random string;
   transmit the random string to the mobile device via short message service (SMS);
   receive a one-time password from the mobile device derived from the random string, wherein the one-time password is derived by computing a Media Access Control (MAC) address and truncating the MAC address to obtain the one-time password; and
   allow the access request in response to the one-time password corresponding to the random string based on the shared key.

2. The apparatus of claim 1, wherein the mobile device number and the pre-shared key are received over a transport layer security (TLS) encrypted channel.

3. The apparatus of claim 1, wherein the shared key is used for two-factor authentication of the username and password for subsequent login.

4. The apparatus of claim 1, wherein the apparatus is further caused to provide information to the client encrypted with the shared key.

5. The apparatus of claim 1, wherein the MAC address is computed from the shared key.

6. A computer program product comprising at least one non-transitory computer-readable storage medium having computer-executable program code instructions stored therein, the computer-executable program code instructions comprising program code instructions to:
   receive a request for registration for two-factor authentication from a client;
   receive a username and password;
   provide a request for a mobile device number in response to the username and password corresponding to an account;
   receive the mobile device number and a pre-shared key;
   send, to a mobile device corresponding to the mobile device number, an identity of the client and a server key share;
   receive, from the mobile device, a device key share;
   send information corresponding to an exchange with the mobile device and a challenge derived from the pre-shared key to the client in response to the device key share corresponding to the server key share;
   receive from the client, confirmation of registration with the mobile device;
   establish a shared key in response to verification of the confirmation;
   receive an access request including the username and password;
   select a random string;
   transmit the random string to the mobile device via short message service (SMS);
   receive a one-time password from the mobile device derived from the random string, wherein the one-time password is derived by computing a Media Access Control (MAC) address and truncating the MAC address to obtain the one-time password; and
   allow the access request in response to the one-time password corresponding to the random string based on the shared key.

7. The computer program product of claim 6, wherein the mobile device number and the pre-shared key are received over a transport layer security (TLS) encrypted channel.

8. The computer program product of claim 6, wherein the shared key is used for two-factor authentication of the username and password for subsequent login.

9. The computer program product of claim 6, further comprising program code instructions to provide information to the client encrypted with the shared key.

10. The computer program product of claim 6, wherein the MAC address is computed from the shared key.

11. A method for registering two-factor authentication comprising:
- receiving a request for registration for two-factor authentication from a client;
- receiving a username and password;
- providing a request for a mobile device number in response to the username and password corresponding to an account;
- receiving the mobile device number and a pre-shared key;
- sending, to a mobile device corresponding to the mobile device number, an identity of the client and a server key share;
- receiving, from the mobile device, a device key share;
- sending information corresponding to an exchange with the mobile device and a challenge derived from the pre-shared key to the client in response to the device key share corresponding to the server key share;
- receiving from the client, confirmation of registration with the mobile device;
- establishing shared key in response to verification of the confirmation;
- receiving an access request including the username and password;
- selecting a random string;
- transmitting the random string to the mobile device via short message service (SMS);
- receiving a one-time password from the mobile device derived from the random string, wherein the one-time password is derived by computing a Media Access Control (MAC) address and truncating the MAC address to obtain the one-time password; and
- allowing the access request in response to the one-time password corresponding to the random string based on the shared key.

12. The method of claim 11, wherein the mobile device number and the pre-shared key are received over a transport layer security (TLS) encrypted channel.

13. The method of claim 11, wherein the shared key is used for two-factor authentication of the username and password for subsequent login.

14. The method of claim 11, further comprising providing information to the client encrypted with the shared key.

15. The method of claim 11, wherein the MAC address is computed from the shared key.

* * * * *